United States Patent
Rhead et al.

(10) Patent No.: US 10,015,474 B2
(45) Date of Patent: Jul. 3, 2018

(54) METHODS FOR END-USER PARALLAX ADJUSTMENT

(71) Applicant: Fluke Corporation, Everett, WA (US)

(72) Inventors: Jamie Rhead, Plymouth, MN (US); Thomas J. McManus, Maple Grove, MN (US)

(73) Assignee: Fluke Corporation, Everett, WA (US)

(*) Notice: Subject to any disclaimer, the term of this patent is extended or adjusted under 35 U.S.C. 154(b) by 482 days.

(21) Appl. No.: 14/692,279

(22) Filed: Apr. 21, 2015

(65) Prior Publication Data

US 2015/0304636 A1    Oct. 22, 2015

Related U.S. Application Data

(60) Provisional application No. 61/982,665, filed on Apr. 22, 2014.

(51) Int. Cl.
*H04N 13/02* (2006.01)
*H04N 5/232* (2006.01)
(Continued)

(52) U.S. Cl.
CPC ....... *H04N 13/0246* (2013.01); *H04N 5/2258* (2013.01); *H04N 5/23216* (2013.01);
(Continued)

(58) Field of Classification Search
CPC .......... H04N 13/0007; H04N 13/0246; H04N 5/2258; H04N 5/23293; H04N 5/33; H04N 5/332
(Continued)

(56) References Cited

U.S. PATENT DOCUMENTS 6,249,311 B1* 6/2001 Rouse, Jr. .......... H04N 5/23209
                                                 348/164
2006/0289772 A1* 12/2006 Johnson .................. G01C 3/08
                                                 250/370.08
(Continued)

FOREIGN PATENT DOCUMENTS

CN        101067710 A     11/2007

OTHER PUBLICATIONS

Extended Search Report for EP Application No. 15164603.1, dated Sep. 16, 2015, 8 pages.
(Continued)

*Primary Examiner* — William C Vaughn, Jr.
*Assistant Examiner* — Naod Belai
(74) *Attorney, Agent, or Firm* — Fredrikson & Byron, P.A.

(57) ABSTRACT

A thermal imaging system having visible light and infrared camera modules can perform various methods for reducing parallax errors between captured visible light and infrared images. The system can perform a first calibration method, which can be manual or automatic, and can receive subsequent parallax refinement adjustments via a user interface. The parallax refinement adjustments may be stored in memory for future use. Systems can include an add-on lens capable of interfacing with the infrared camera module for producing modified infrared images. The system can perform methods to reduce parallax between modified infrared and visible light images, and can receive subsequent parallax refinement adjustments to further reduce parallax between the modified infrared and visible light images. The add-on lens parallax refinement data can be stored in memory of the camera memory of the lens for future use in parallax correction.

20 Claims, 7 Drawing Sheets

(51) Int. Cl.
    *H04N 13/00*     (2018.01)
    *H04N 5/33*     (2006.01)
    *H04N 5/225*     (2006.01)

(52) U.S. Cl.
    CPC ........... *H04N 5/23293* (2013.01); *H04N 5/33* (2013.01); *H04N 5/332* (2013.01); *H04N 13/0007* (2013.01)

(58) Field of Classification Search
    USPC .................................................. 348/164, 46
    See application file for complete search history.

(56) References Cited

U.S. PATENT DOCUMENTS

| | | | |
|---|---|---|---|
| 2007/0235634 A1 | 10/2007 | Ottney et al. | |
| 2013/0083199 A1* | 4/2013 | Choi .................. | H04N 5/23212 348/164 |
| 2013/0321641 A1 | 12/2013 | McManus et al. | |

OTHER PUBLICATIONS

Ti32, TiR32, Ti29, TiR29, Ti27, TiR27 Thermal Imagers Users, Manual, May 2, 2011, pp. 1-42.

\* cited by examiner

METHODS FOR END-USER PARALLAX ADJUSTMENT

BACKGROUND

Thermal imaging cameras are used in a variety of situations. For example, thermal imaging cameras are often used during maintenance inspections to thermally inspect equipment. Example equipment may include rotating machinery, electrical panels, or rows of circuit breakers, among other types of equipment. Thermal inspections can use infrared (IR) energy detection to detect equipment hot spots such as overheating machinery or electrical components, helping to ensure timely repair or replacement of the overheating equipment before a more significant problem develops.

Depending on the configuration of the camera, the thermal imaging camera may also generate a visible light image of the same object. The camera may display the infrared image and the visible light image in a coordinated manner, for example, to help an operator interpret the thermal image generated by the thermal imaging camera. Unlike visible light images which generally provide good contrast between different objects, it is often difficult to recognize and distinguish different features in a thermal image as compared to the real-world scene. For this reason, an operator may rely on a visible light image to help interpret and focus the thermal image.

In applications where a thermal imaging camera is configured to generate both a thermal image and a visual light image, the camera may include two separate sets of optics: visible light optics that focus visible light on a visible light sensor for generating the visible light image, and infrared optics that focus infrared radiation on an infrared sensor for generating the infrared optics.

Cameras that comprise visible light optics and sensor as well as infrared optics and sensor may position these separate arrangements in separate locations on the camera. For example, the VL components may be located above, below, or to either side of the IR components. Accordingly, it is conceivable that, in some embodiments, the scene observed by the two sets of optics is substantially different, with one being offset from the other, that is, there may be a parallax offset incorporated between the images, which may be a manifestation of a registration error due to parallax from the two sets of optics.

In some previous embodiments, a user may adjust the focus of one or more sets of optics in an effort to resolve this parallax offset. Other cameras may be fixed-focus devices and may not have an adjustable focus with which to address the parallax offset. Some cameras can include distance-to-target measurements and adjust parallax based on such a measurement. However, in any case, situations may arise in which a focusing, distance-to-target, or factory calibrated parallax correction is insufficient and does not adequately correct for a parallax error. In addition, the incorporation of an add-on lens into a thermal imaging camera can act to compound or complicate a parallax correction.

SUMMARY

Aspects of the disclosure are directed toward system and methods for reducing parallax errors between infrared (IR) and visible light (VL) images. In some examples, IR and VL images can undergo a first parallax correction in order to reduce the parallax error between the images. Such corrections can be performed, for instance, via focusing one or both of the IR and VL images. After the first parallax correction, the IR and VL images can be displayed, including the first correction. Subsequently, a user can manually register the IR and VL images via a user interface. The manual registration can result in a first set of parallax refinement data which can correct for remaining parallax after the first parallax correction. The first set of parallax refinement data can be stored in memory (e.g., memory in the camera) for future use, such as for input into a parallax correction mathematical algorithm.

In some examples, a system can include an add-on IR lens for producing modified IR images. In a process similar to described above, the system can perform a parallax correction (e.g., a second parallax correction) to reduce the parallax between a modified IR image and a corresponding VL image. The resulting modified IR and corresponding VL image can be presented on the display after a parallax correction process. Subsequently, a user can manually register the modified IR and corresponding VL images via the user interface. The manual registration can result in a second set of parallax refinement data. This second set of parallax refinement data can be stored in a memory for future use. In some examples, the second set of parallax refinement data can be stored in camera memory or memory stored within the add-on lens.

In some embodiments, systems can employ mathematical algorithms for performing automated parallax refinement. In some examples, the system includes one or more mathematical algorithms capable of receiving parallax refinement data as inputs to determine a parallax refinement value. For instance, in some examples, the system can receive parallax refinement data stored in memory (e.g., one or both of camera memory and lens memory) as inputs into the mathematical algorithm. In some embodiments, parallax refinement data can be reset to not contribute to the parallax refinement determined by the one or more mathematical algorithms.

DETAILED DESCRIPTION

The following detailed description is exemplary in nature and is not intended to limit the scope, applicability, or configuration of the invention in any way. Rather, the following description provides some practical illustrations for implementing examples of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

A thermal imaging camera may be used to detect heat patterns across a scene, including an object or objects, under observation. The thermal imaging camera may detect infrared radiation given off by the scene and convert the infrared radiation into an infrared image indicative of the heat patterns. In some embodiments, the thermal imaging camera may also capture visible light from the scene and convert the visible light into a visible light image. Depending on the configuration of the thermal imaging camera, the camera may include infrared optics to focus the infrared radiation on an infrared sensor and visible light optics to focus the visible light on a visible light sensor.

Various embodiments provide methods and systems for producing thermal images with reduced noise using averaging techniques. To further improve image quality and eliminate problems that may arise from averaging (e.g. blurring, ghosting, etc.), an image alignment process is performed on the thermal images prior to averaging.

Figure 1:
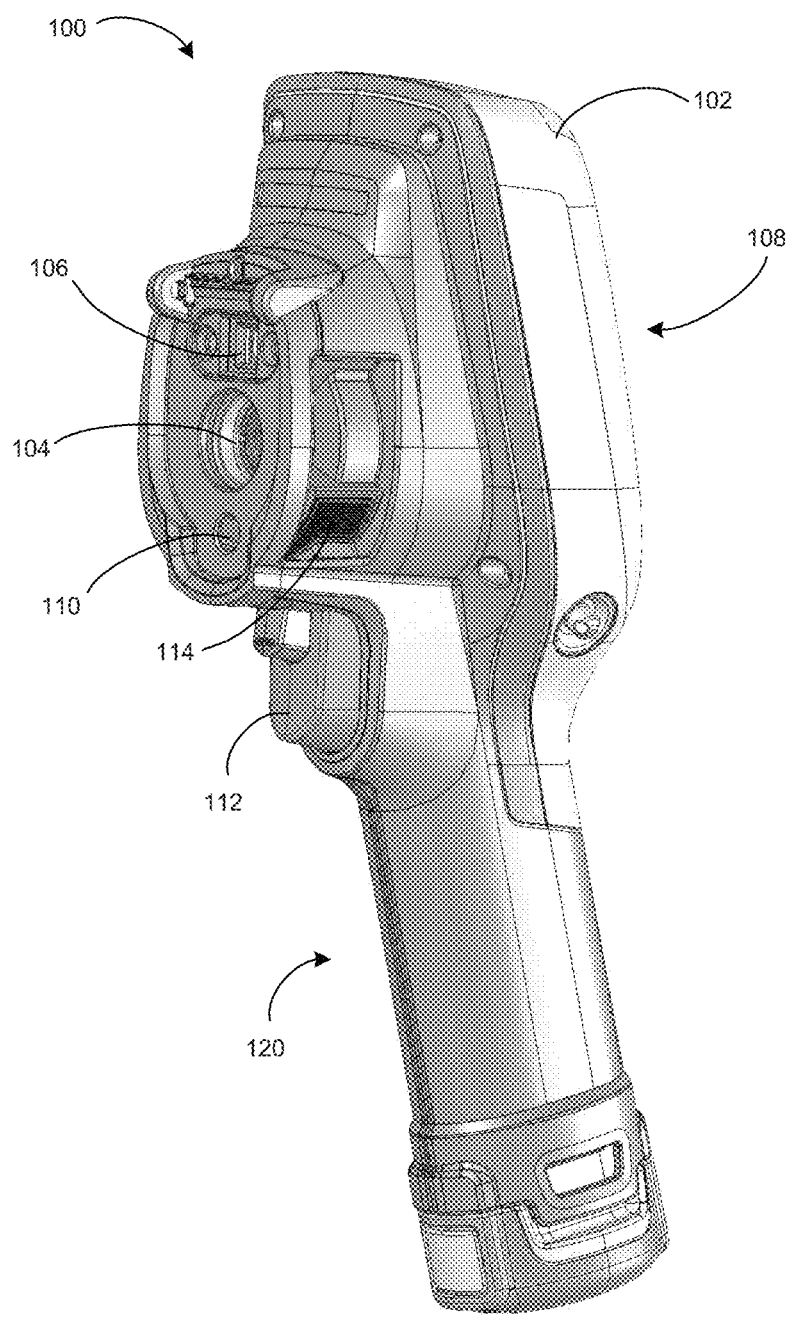
FIG. 1 is a perspective front view of an example thermal imaging camera.
Figure 2:
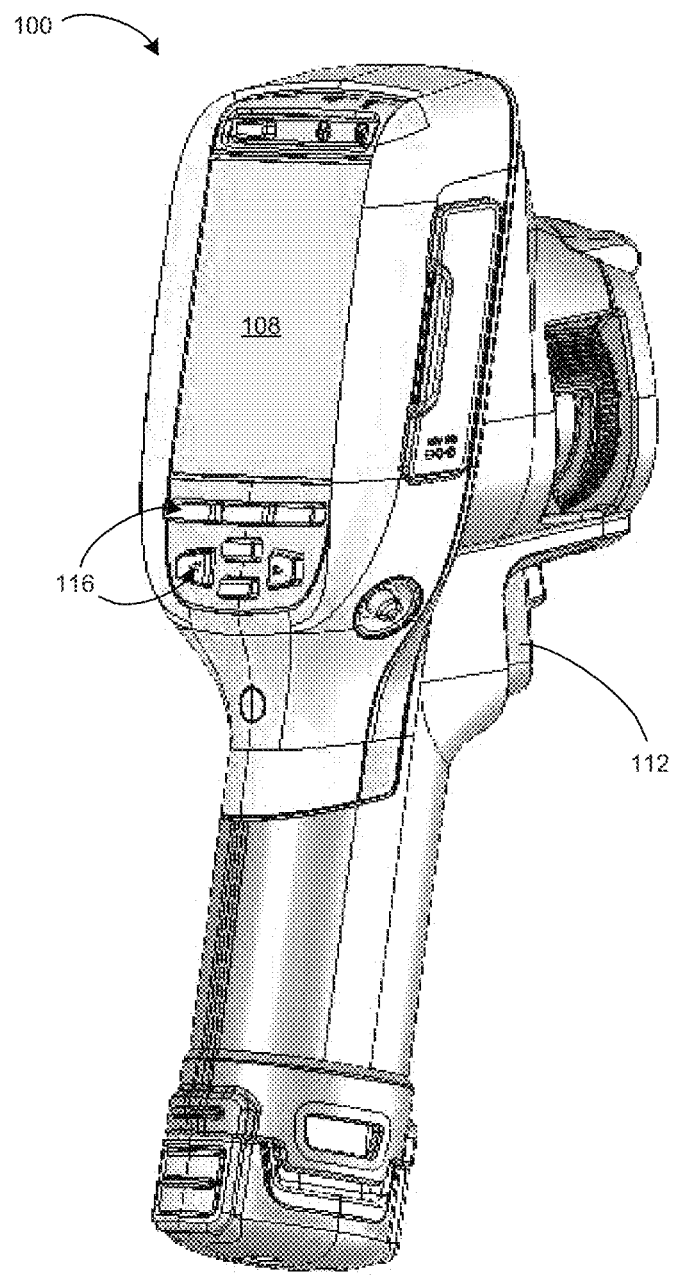
FIG. 2 is a perspective back view of the example thermal imaging camera of FIG. 1.

FIGS. 1 and 2 show front and back perspective views, respectively of an example thermal imaging camera 100, which includes a housing 102, an infrared lens assembly 104, a visible light lens assembly 106, a display 108, a laser 110, and a trigger control 112. Housing 102 houses the various components of thermal imaging camera 100. The bottom portion of thermal imaging camera 100 includes a carrying handle for holding and operating the camera via one hand. Infrared lens assembly 104 receives infrared radiation from a scene and focuses the radiation on an infrared sensor for generating an infrared image of a scene. Visible light lens assembly 106 receives visible light from a scene and focuses the visible light on a visible light sensor for generating a visible light image of the same scene. Thermal imaging camera 100 captures the visible light image and/or the infrared image in response to depressing trigger control 112. In addition, thermal imaging camera 100 controls display 108 to display the infrared image and the visible light image generated by the camera, e.g., to help an operator thermally inspect a scene. Thermal imaging camera 100 may also include a focus mechanism coupled to infrared lens assembly 104 that is configured to move at least one lens of the infrared lens assembly so as to adjust the focus of an infrared image generated by the thermal imaging camera.

In operation, thermal imaging camera 100 detects heat patterns in a scene by receiving energy emitted in the infrared-wavelength spectrum from the scene and processing the infrared energy to generate a thermal image. Thermal imaging camera 100 may also generate a visible light image of the same scene by receiving energy in the visible light-wavelength spectrum and processing the visible light energy to generate a visible light image. As described in greater detail below, thermal imaging camera 100 may include an infrared camera module that is configured to capture an infrared image of the scene and a visible light camera module that is configured to capture a visible light image of the same scene. The infrared camera module may receive infrared radiation projected through infrared lens assembly 104 and generate therefrom infrared image data. The visible light camera module may receive light projected through visible light lens assembly 106 and generate therefrom visible light data.

In some examples, thermal imaging camera 100 collects or captures the infrared energy and visible light energy substantially simultaneously (e.g., at the same time) so that the visible light image and the infrared image generated by the camera are of the same scene at substantially the same time. In these examples, the infrared image generated by thermal imaging camera 100 is indicative of localized temperatures within the scene at a particular period of time while the visible light image generated by the camera is indicative of the same scene at the same period of time. In other examples, thermal imaging camera may capture infrared energy and visible light energy from a scene at different periods of time.

Visible light lens assembly 106 includes at least one lens that focuses visible light energy on a visible light sensor for generating a visible light image. Visible light lens assembly 106 defines a visible light optical axis which passes through the center of curvature of the at least one lens of the assembly. Visible light energy projects through a front of the lens and focuses on an opposite side of the lens. Visible light lens assembly 106 can include a single lens or a plurality of lenses (e.g., two, three, or more lenses) arranged in series. In addition, visible light lens assembly 106 can have a fixed focus or can include a focus adjustment mechanism for changing the focus of the visible light optics. In examples in which visible light lens assembly 106 includes a focus adjustment mechanism, the focus adjustment mechanism may be a manual adjustment mechanism or an automatic adjustment mechanism.

Infrared lens assembly 104 also includes at least one lens that focuses infrared energy on an infrared sensor for generating a thermal image. Infrared lens assembly 104 defines an infrared optical axis which passes through the center of curvature of lens of the assembly. During operation, infrared energy is directed through the front of the lens and focused on an opposite side of the lens. Infrared lens assembly 104 can include a single lens or a plurality of lenses (e.g., two, three, or more lenses), which may be arranged in series.

As briefly described above, thermal imaging camera 100 includes a focus mechanism for adjusting the focus of an infrared image captured by the camera. In the example shown in FIGS. 1 and 2, thermal imaging camera 100 includes focus ring 114. Focus ring 114 is operatively coupled (e.g., mechanically and/or electrically coupled) to at least one lens of infrared lens assembly 104 and configured to move the at least one lens to various focus positions so as to focus the infrared image captured by thermal imaging camera 100. Focus ring 114 may be manually rotated about at least a portion of housing 102 so as to move the at least one lens to which the focus ring is operatively coupled. In some examples, focus ring 114 is also operatively coupled to display 108 such that rotation of focus ring 114 causes at least a portion of a visible light image and at least a portion of an infrared image concurrently displayed on display 108 to move relative to one another. In different examples, thermal imaging camera 100 may include a manual focus adjustment mechanism that is implemented in a configuration other than focus ring 114, or may, in other embodiments, simply maintain a fixed focus.

In some examples, thermal imaging camera 100 may include an automatically adjusting focus mechanism in addition to or in lieu of a manually adjusting focus mechanism. An automatically adjusting focus mechanism may be operatively coupled to at least one lens of infrared lens assembly 104 and configured to automatically move the at least one lens to various focus positions, e.g., in response to instructions from thermal imaging camera 100. In one application of such an example, thermal imaging camera 100 may use laser 110 to electronically measure a distance between an object in a target scene and the camera, referred to as the distance-to-target. Thermal imaging camera 100 may then control the automatically adjusting focus mechanism to move the at least one lens of infrared lens assembly 104 to a focus position that corresponds to the distance-to-target data determined by thermal imaging camera 100. The focus position may correspond to the distance-to-target data in that the focus position may be configured to place the object in the target scene at the determined distance in focus. In some examples, the focus position set by the automatically adjusting focus mechanism may be manually overridden by an operator, e.g., by rotating focus ring 114.

Data of the distance-to-target, as measured by the laser 110, can be stored and associated with the corresponding captured image. For images which are captured using automatic focus, this data will be gathered as part of the focusing process. In some embodiments, the thermal imaging camera will also detect and save the distance-to-target data when an image is captured. This data may be obtained by the thermal imaging camera when the image is captured by using the laser 110 or, alternatively, by detecting the lens position and correlating the lens position to a known distance-to-target associated with that lens position. The distance-to-target data may be used by the thermal imaging camera 100 to direct the user to position the camera at the same distance from the target, such as by directing a user to move closer or further from the target based on laser measurements taken as the user repositions the camera, until the same distance-to-target is achieved as in an earlier image. The thermal imaging camera may further automatically set the lenses to the same positions as used in the earlier image, or may direct the user to reposition the lenses until the original lens settings are obtained.

During operation of thermal imaging camera 100, an operator may wish to view a thermal image of a scene and/or a visible light image of the same scene generated by the camera. For this reason, thermal imaging camera 100 may include a display. In the examples of FIGS. 1 and 2, thermal imaging camera 100 includes display 108, which is located on the back of housing 102 opposite infrared lens assembly 104 and visible light lens assembly 106. Display 108 may be configured to display a visible light image, an infrared image, and/or a combined image that includes a simultaneous display of the visible light image and the infrared image. In different examples, display 108 may be remote (e.g., separate) from infrared lens assembly 104 and visible light lens assembly 106 of thermal imaging camera 100, or display 108 may be in a different spatial arrangement relative to infrared lens assembly 104 and/or visible light lens assembly 106. Therefore, although display 108 is shown behind infrared lens assembly 104 and visible light lens assembly 106 in FIG. 2, other locations for display 108 are possible.

Thermal imaging camera 100 can include a variety of user input media for controlling the operation of the camera and adjusting different settings of the camera. Example control functions may include adjusting the focus of the infrared and/or visible light optics, opening/closing a shutter, capturing an infrared and/or visible light image, or the like. In the example of FIGS. 1 and 2, thermal imaging camera 100 includes a depressible trigger control 112 for capturing an infrared and visible light image, and buttons 116, which form part of the user interface, for controlling other aspects of the operation of the camera. A different number or arrangement of user input media are possible, and it should be appreciated that the disclosure is not limited in this respect. For example, thermal imaging camera 100 may include a touch screen display 108 which receives user input by depressing different portions of the screen.

Figure 3:
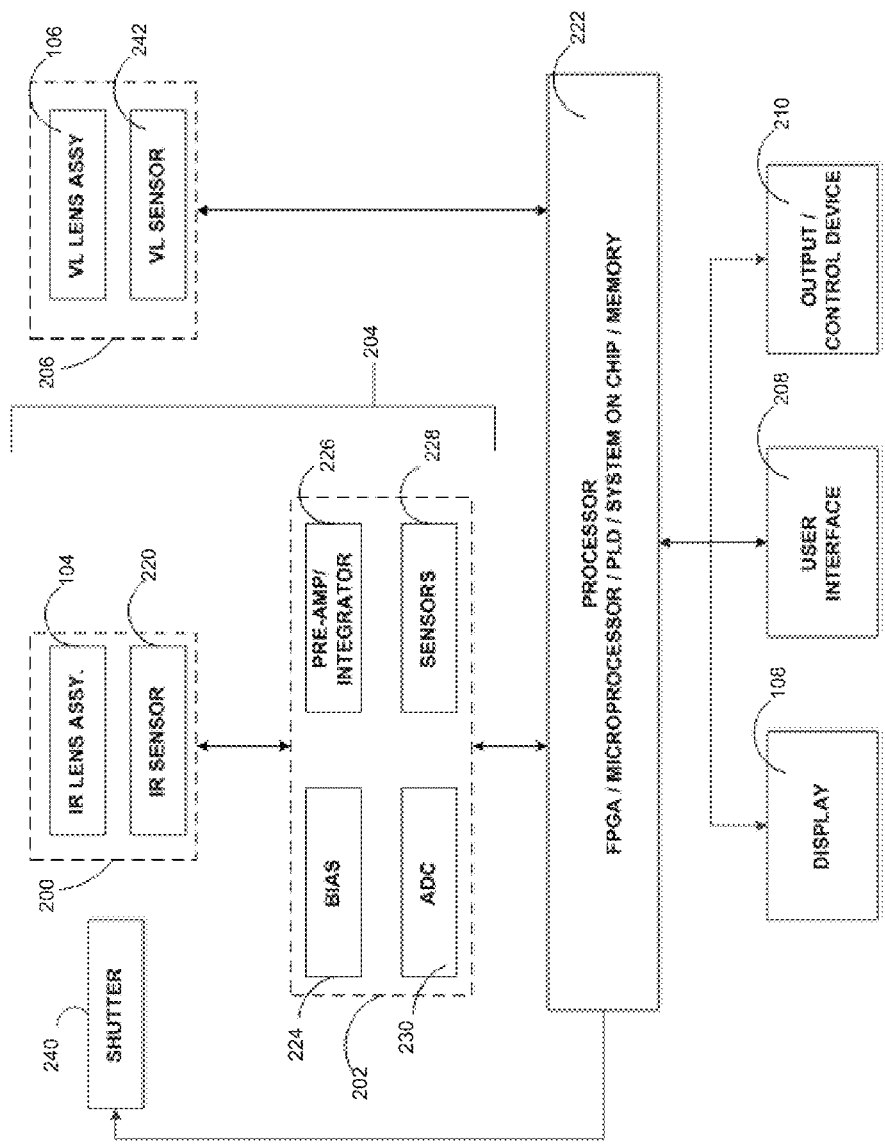
FIG. 3 is a functional block diagram illustrating example components of the thermal imaging camera of FIGS. 1 and 2.

FIG. 3 is a functional block diagram illustrating components of an example of thermal imaging camera 100. Thermal imaging camera 100 includes an IR camera module 200, front end circuitry 202. The IR camera module 200 and front end circuitry 202 are sometimes referred to in combination as front end stage or front end components 204 of the infrared camera 100. Thermal imaging camera 100 may also include a visible light camera module 206, a display 108, a user interface 208, and an output/control device 210.

Infrared camera module 200 may be configured to receive infrared energy emitted by a target scene and to focus the infrared energy on an infrared sensor for generation of infrared energy data, e.g., that can be displayed in the form of an infrared image on display 108 and/or stored in memory. Infrared camera module 200 can include any suitable components for performing the functions attributed to the module herein. In the example of FIG. 3, infrared camera module 200 is illustrated as including infrared lens assembly 104 and infrared sensor 220. As described above with respect to FIGS. 1 and 2, infrared lens assembly 104 includes at least one lens that takes infrared energy emitted by a target scene and focuses the infrared energy on infrared sensor 220. Infrared sensor 220 responds to the focused infrared energy by generating an electrical signal that can be converted and displayed as an infrared image on display 108.

Infrared sensor 220 may include one or more focal plane arrays (FPA) that generate electrical signals in response to infrared energy received through infrared lens assembly 104. Each FPA can include a plurality of infrared sensor elements including, e.g., bolometers, photon detectors, or other suitable infrared sensor elements. In operation, each sensor element, which may each be referred to as a sensor pixel, may change an electrical characteristic (e.g., voltage or resistance) in response to absorbing infrared energy received from a target scene. In turn, the change in electrical characteristic can provide an electrical signal that can be received by a processor 222 and processed into an infrared image displayed on display 108.

For instance, in examples in which infrared sensor 220 includes a plurality of bolometers, each bolometer may absorb infrared energy focused through infrared lens assembly 104 and increase in temperature in response to the absorbed energy. The electrical resistance of each bolometer may change as the temperature of the bolometer changes. With each detector element functioning as a sensor pixel, a two-dimensional image or picture representation of the infrared radiation can be further generated by translating the changes in resistance of each detector element into a time-multiplexed electrical signal that can be processed for visualization on a display or storage in memory (e.g., of a computer). Processor 222 may measure the change in resistance of each bolometer by applying a current (or voltage) to each bolometer and measure the resulting voltage (or current) across the bolometer. Based on these data, processor 222 can determine the amount of infrared energy emitted by different portions of a target scene and control display 108 to display a thermal image of the target scene.

Independent of the specific type of infrared sensor elements included in the FPA of infrared sensor 220, the FPA array can define any suitable size and shape. In some examples, infrared sensor 220 includes a plurality of infrared sensor elements arranged in a grid pattern such as, e.g., an array of sensor elements arranged in vertical columns and horizontal rows. In various examples, infrared sensor 220 may include an array of vertical columns by horizontal rows of, e.g., 16×16, 50×50, 160×120, 120×160, or 650×480. In other examples, infrared sensor 220 may include a smaller number of vertical columns and horizontal rows (e.g., 1×1), a larger number vertical columns and horizontal rows (e.g., 1000×1000), or a different ratio of columns to rows.

In certain embodiments a Read Out Integrated Circuit (ROIC) is incorporated on the IR sensor 220. The ROIC is used to output signals corresponding to each of the sensor pixels. Such ROIC is commonly fabricated as an integrated circuit on a silicon substrate. The plurality of detector elements may be fabricated on top of the ROIC, wherein their combination provides for the IR sensor 220. In some embodiments, the ROIC can include components discussed elsewhere in this disclosure (e.g. an analog-to-digital converter (ADC)) incorporated directly onto the FPA circuitry. Such integration of the ROIC, or other further levels of integration not explicitly discussed, should be considered within the scope of this disclosure.

As described above, the IR sensor 220 generates a series of electrical signals corresponding to the infrared radiation received by each infrared detector element to represent a thermal image. A "frame" of thermal image data is generated when the voltage signal from each infrared detector element is obtained by scanning all of the rows that make up the IR sensor 220. Again, in certain embodiments involving bolometers as the infrared detector elements, such scanning is done by switching a corresponding detector element into the system circuit and applying a bias voltage across such switched-in element. Successive frames of thermal image data are generated by repeatedly scanning the rows of the IR sensor 220, with such frames being produced at a rate sufficient to generate a video representation (e.g. 30 Hz, or 60 Hz) of the thermal image data.

The front end circuitry 202 includes circuitry for interfacing with and controlling the IR camera module 200. In addition, the front end circuitry 202 initially processes and transmits collected infrared image data to a processor 222 via a connection therebetween. More specifically, the signals generated by the IR sensor 220 are initially conditioned by the front end circuitry 202 of the thermal imaging camera 100. In certain embodiments, as shown, the front end circuitry 202 includes a bias generator 224 and a pre-amp/integrator 226. In addition to providing the detector bias, the bias generator 224 can optionally add or subtract an average bias current from the total current generated for each switched-in detector element. The average bias current can be changed in order (i) to compensate for deviations to the entire array of resistances of the detector elements resulting from changes in ambient temperatures inside the thermal imaging camera 100 and (ii) to compensate for array-to-array variations in the average detector elements of the IR sensor 220. Such bias compensation can be automatically controlled by the thermal imaging camera 100 or software, or can be user controlled via input to the output/control device 210 or processor 222. Following provision of the detector bias and optional subtraction or addition of the average bias current, the signals can be passed through a pre-amp/integrator 226. Typically, the pre-amp/integrator 226 is used to condition incoming signals, e.g., prior to their digitization. As a result, the incoming signals can be adjusted to a form that enables more effective interpretation of the signals, and in turn, can lead to more effective resolution of the created image. Subsequently, the conditioned signals are sent downstream into the processor 222 of the thermal imaging camera 100.

In some embodiments, the front end circuitry 202 can include one or more additional elements for example, additional sensors 228 or an ADC 230. Additional sensors 228 can include, for example, temperature sensors, visual light sensors (such as a CCD), pressure sensors, magnetic sensors, etc. Such sensors can provide additional calibration and detection information to enhance the functionality of the thermal imaging camera 100. For example, temperature sensors can provide an ambient temperature reading near the IR sensor 220 to assist in radiometry calculations. A magnetic sensor, such as a Hall effect sensor, can be used in combination with a magnet mounted on the lens to provide lens focus position information. Such information can be useful for calculating distances, or determining a parallax offset for use with visual light scene data gathered from a visual light sensor.

An ADC 230 can provide the same function and operate in substantially the same manner as discussed below, however its inclusion in the front end circuitry 202 may provide certain benefits, for example, digitization of scene and other sensor information prior to transmittal to the processor 222 via the connection therebetween. In some embodiments, the ADC 230 can be integrated into the ROIC, as discussed above, thereby eliminating the need for a separately mounted and installed ADC 230.

In some embodiments, front end components can further include a shutter 240. A shutter 240 can be externally or internally located relative to the lens and operate to open or close the view provided by the IR lens assembly 104. As is known in the art, the shutter 240 can be mechanically positionable, or can be actuated by an electro-mechanical device such as a DC motor or solenoid. Embodiments of the invention may include a calibration or setup software implemented method or setting which utilize the shutter 240 to establish appropriate bias levels for each detector element.

Components described as processors within thermal imaging camera 100, including processor 222, may be implemented as one or more processors, such as one or more microprocessors, digital signal processors (DSPs), application specific integrated circuits (ASICs), field programmable gate arrays (FPGAs), programmable logic circuitry, or the like, either alone or in any suitable combination. Processor 222 may also include memory that stores program instructions and related data that, when executed by processor 222, cause thermal imaging camera 100 and processor 222 to perform the functions attributed to them in this disclosure. Memory may include any fixed or removable magnetic, optical, or electrical media, such as RAM, ROM, CD-ROM, hard or floppy magnetic disks, EEPROM, or the like. Memory may also include a removable memory portion that may be used to provide memory updates or increases in memory capacities. A removable memory may also allow image data to be easily transferred to another computing device, or to be removed before thermal imaging camera 100 is used in another application. Processor 222 may also be implemented as a System on Chip that integrates all components of a computer or other electronic system into a single chip. These elements manipulate the conditioned scene image data delivered from the front end stages 204 in order to provide output scene data that can be displayed or stored for use by the user. Subsequently, the processor 222 (processing circuitry) sends the processed data to a display 108 or other output/control device 210.

During operation of thermal imaging camera 100, processor 222 can control infrared camera module 200 to generate infrared image data for creating an infrared image. Processor 222 can generate a digital "frame" of infrared image data. By generating a frame of infrared image data, processor 222 captures an infrared image of a target scene at a given point in time.

Processor 222 can capture a single infrared image or "snap shot" of a target scene by measuring the electrical signal of each infrared sensor element included in the FPA of infrared sensor 220 a single time. Alternatively, processor 222 can capture a plurality of infrared images of a target scene by repeatedly measuring the electrical signal of each infrared sensor element included in the FPA of infrared sensor 220. In examples in which processor 222 repeatedly measures the electrical signal of each infrared sensor element included in the FPA of infrared sensor 220, processor 222 may generate a dynamic thermal image (e.g., a video representation) of a target scene. For example, processor 222 may measure the electrical signal of each infrared sensor element included in the FPA at a rate sufficient to generate a video representation of thermal image data such as, e.g., 30 Hz or 60 Hz. Processor 222 may perform other operations in capturing an infrared image such as sequentially actuating a shutter 240 to open and close an aperture of infrared lens assembly 104, or the like.

With each sensor element of infrared sensor 220 functioning as a sensor pixel, processor 222 can generate a two-dimensional image or picture representation of the infrared radiation from a target scene by translating changes in an electrical characteristic (e.g., resistance) of each sensor element into a time-multiplexed electrical signal that can be processed, e.g., for visualization on display 108 and/or storage in memory. When displayed on a display 108, an infrared image can comprise a plurality of display pixels. Display pixels can have any defined relationship with corresponding sensor pixels. In some examples, each sensor pixel corresponds to a display pixel in an image representation of infrared data. In other examples, a plurality of sensor pixels may be combined (e.g., averaged) to provide infrared information for a single display pixel. Because relationships between display pixels and sensor pixels are defined with respect to camera operation, the generic term "pixel" may refer to the sensor pixel, the display pixel, or the data as it is processed from the sensor pixel to the display pixel unless otherwise stated. Processor 222 may perform computations to convert raw infrared image data into scene temperatures (radiometry) including, in some examples, colors corresponding to the scene temperatures.

Processor 222 may control display 108 to display at least a portion of an infrared image of a captured target scene. In some examples, processor 222 controls display 108 so that the electrical response of each sensor element of infrared sensor 220 is associated with a single pixel on display 108. In other examples, processor 222 may increase or decrease the resolution of an infrared image so that there are more or fewer pixels displayed on display 108 than there are sensor elements in infrared sensor 220. Processor 222 may control display 108 to display an entire infrared image (e.g., all portions of a target scene captured by thermal imaging camera 100) or less than an entire infrared image (e.g., a lesser port of the entire target scene captured by thermal imaging camera 100). Processor 222 may perform other image processing functions, as described in greater detail below.

Independent of the specific circuitry, thermal imaging camera 100 may be configured to manipulate data representative of a target scene so as to provide an output that can be displayed, stored, transmitted, or otherwise utilized by a user.

Thermal imaging camera 100 includes visible light camera module 206. Visible light camera module 206 may be configured to receive visible light energy from a target scene and to focus the visible light energy on a visible light sensor for generation of visible light energy data, e.g., that can be displayed in the form of a visible light image on display 108 and/or stored in memory. Visible light camera module 206 can include any suitable components for performing the functions attributed to the module herein. In the example of FIG. 3, visible light camera module 206 is illustrated as including visible light lens assembly 106 and visible light sensor 242. As described above with respect to FIGS. 1 and 2, visible light lens assembly 106 includes at least one lens that takes visible light energy emitted by a target scene and focuses the visible light energy on visible light sensor 242. Visible light sensor 242 responds to the focused energy by generating an electrical signal that can be converted and displayed as a visible light image on display 108.

Visible light sensor 242 may include a plurality of visible light sensor elements such as, e.g., CMOS detectors, CCD detectors, PIN diodes, avalanche photo diodes, or the like. The number of visible light sensor elements may be the same as or different than the number of infrared light sensor elements.

In operation, optical energy received from a target scene may pass through visible light lens assembly 106 and be focused on visible light sensor 242. When the optical energy impinges upon the visible light sensor elements of visible light sensor 242, photons within the photodetectors may be released and converted into a detection current. Processor 222 can process this detection current to form a visible light image of the target scene.

During use of thermal imaging camera 100, processor 222 can control visible light camera module 206 to generate visible light data from a captured target scene for creating a visible light image. The visible light data may include luminosity data indicative of the color(s) associated with different portions of the captured target scene and/or the magnitude of light associated with different portions of the captured target scene. Processor 222 can generate a "frame" of visible light image data by measuring the response of each visible light sensor element of thermal imaging camera 100 a single time. By generating a frame of visible light data, processor 222 captures visible light image of a target scene at a given point in time. Processor 222 may also repeatedly measure the response of each visible light sensor element of thermal imaging camera 100 so as to generate a dynamic thermal image (e.g., a video representation) of a target scene, as described above with respect to infrared camera module 200.

With each sensor element of visible light camera module 206 functioning as a sensor pixel, processor 222 can generate a two-dimensional image or picture representation of the visible light from a target scene by translating an electrical response of each sensor element into a time-multiplexed electrical signal that can be processed, e.g., for visualization on display 108 and/or storage in memory.

Processor 222 may control display 108 to display at least a portion of a visible light image of a captured target scene. In some examples, processor 222 controls display 108 so that the electrical response of each sensor element of visible light camera module 206 is associated with a single pixel on display 108. In other examples, processor 222 may increase or decrease the resolution of a visible light image so that there are more or fewer pixels displayed on display 108 than there are sensor elements in visible light camera module 206. Processor 222 may control display 108 to display an entire visible light image (e.g., all portions of a target scene captured by thermal imaging camera 100) or less than an entire visible light image (e.g., a lesser port of the entire target scene captured by thermal imaging camera 100).

As noted above, processor 222 may be configured to determine a distance between thermal imaging camera 100 and an object in a target scene captured by a visible light image and/or infrared image generated by the camera. Processor 222 may determine the distance based on a focus position of the infrared optics associated with the camera. For example, processor 222 may detect a position (e.g., a physical position) of a focus mechanism associated with the infrared optics of the camera (e.g., a focus position associated with the infrared optics) and determine a distance-to-target value associated with the position. Processor 222 may then reference data stored in memory that associates different positions with different distance-to-target values to determine a specific distance between thermal imaging camera 100 and the object in the target scene.

In these and other examples, processor 222 may control display 108 to concurrently display at least a portion of the visible light image captured by thermal imaging camera 100 and at least a portion of the infrared image captured by thermal imaging camera 100. Such a concurrent display may be useful in that an operator may reference the features displayed in the visible light image to help understand the features concurrently displayed in the infrared image, as the operator may more easily recognize and distinguish different real-world features in the visible light image than the infrared image. In various examples, processor 222 may control display 108 to display the visible light image and the infrared image in side-by-side arrangement, in a picture-in-picture arrangement, where one of the images surrounds the other of the images, or any other suitable arrangement where the visible light and the infrared image are concurrently displayed.

For example, processor 222 may control display 108 to display the visible light image and the infrared image in a combined arrangement. In such an arrangement, for a pixel or set of pixels in the visible light image representative of a portion of the target scene, there exists a corresponding pixel or set of pixels in the infrared image, representative of substantially the same portion of the target scene. Thus, in some such arrangements, the visible light image and the infrared image may be superimposed on top of one another, at corresponding pixels. An operator may interact with user interface 208 to control the transparency or opaqueness of one or both of the images displayed on display 108. For example, the operator may interact with user interface 208 to adjust the infrared image between being completely transparent and completely opaque and also adjust the visible light image between being completely transparent and completely opaque. Such an exemplary combined arrangement, which may be referred to as an alpha-blended arrangement, may allow an operator to adjust display 108 to display an infrared-only image, a visible light-only image, of any overlapping combination of the two images between the extremes of an infrared-only image and a visible light-only image. Processor 222 may also combine scene information with other data, such as radiometric data, alarm data, and the like. In general, an alpha-blended combination of visible light and infrared images can comprise anywhere from 100 percent infrared and 0 percent visible light to 0 percent infrared and 100 percent visible light. In some embodiments, the amount of blending can be adjusted by a user of the camera. Thus, in some embodiments, a blended image can be adjusted between 100 percent visible light and 100 percent infrared.

Additionally, in some embodiments, the processor 222 can interpret and execute commands from user interface 208, an output/control device 210. This can involve processing of various input signals and transferring those signals to the front end circuitry 202 via a connection therebetween. Components (e.g. motors, or solenoids) proximate the front end circuitry 202 can be actuated to accomplish the desired control function. Exemplary control functions can include adjusting the focus, opening/closing a shutter, triggering sensor readings, adjusting bias values, etc. Moreover, input signals may be used to alter the processing of the image data that occurs in the processor 222.

Processor can further include other components to assist with the processing and control of the infrared imaging camera 100. For example, as discussed above, in some embodiments, an ADC can be incorporated into the processor 222. In such a case, analog signals conditioned by the front-end stages 204 are not digitized until reaching the processor 222. Moreover, some embodiments can include additional on board memory for storage of processing command information and scene data, prior to transmission to the display 108 or the output/control device 210.

An operator may interact with thermal imaging camera 100 via user interface 208, which may include buttons, keys, or another mechanism for receiving input from a user. The operator may receive output from thermal imaging camera 100 via display 108. Display 108 may be configured to display an infrared-image and/or a visible light image in any acceptable palette, or color scheme, and the palette may vary, e.g., in response to user control. In some examples, display 108 is configured to display an infrared image in a monochromatic palette such as grayscale or amber. In other examples, display 108 is configured to display an infrared image in a color palette such as, e.g., ironbow, blue-red, or other high contrast color scheme. Combination of grayscale and color palette displays are also contemplated.

While processor 222 can control display 108 to concurrently display at least a portion of an infrared image and at least a portion of a visible light image in any suitable arrangement, a picture-in-picture arrangement may help an operator to easily focus and/or interpret a thermal image by displaying a corresponding visible image of the same scene in adjacent alignment.

A power supply (not shown) delivers operating power to the various components of thermal imaging camera 100 and, in some examples, may include a rechargeable or non-rechargeable battery and a power generation circuit.

During operation of thermal imaging camera 100, processor 222 controls infrared camera module 200 and visible light camera module 206 with the aid of instructions associated with program information that is stored in memory to generate a visible light image and an infrared image of a target scene. Processor 222 further controls display 108 to display the visible light image and/or the infrared image generated by thermal imaging camera 100.

As discussed, FIG. 1 shows a front perspective view of the thermal imaging camera 100. The thermal imaging camera 100 includes a camera housing 102, the lower portion of which extends into a handle portion 120 for helping grasp the thermal imaging camera 100 during use. The handle portion 120 includes a trigger 112 mounted to the housing 102 for controlling image capture. A display 108 is located on the back of the thermal imaging camera 100 so that infrared images, visible light images, and/or blended images of infrared and visible light can be displayed to the user.

To capture images of an object scene, the thermal imaging camera 100 contains both an infrared (IR) camera module and a visible light (VL) camera module. The placement of the VL camera module and IR camera module is such that the visible and infrared optical axes are roughly parallel to each other, thereby resulting in parallax error. The thermal imaging camera 100 includes the ability to determine the IR lens focus position, which, in turn, can be used to correct for parallax. The VL module includes a visible light sensor formed of an array of visible-light detectors. The IR sensor of the IR camera module is formed of a focal plane array (FPA) of IR detectors, such as microbolometers.

The IR lens assembly 104 shown in FIG. 1 on the thermal imaging camera 100 can comprise a base IR lens assembly that functions to collect IR energy from an object scene and focus the IR energy on the focal plane array contained inside the camera. The thermal imaging camera 100 works with the IR lens alone and can generate thermal images without using any add-on lens hardware. To achieve wider or narrower fields of view, however, the thermal imaging camera 100 is designed to work with a set of add-on IR lenses (not shown in FIG. 1) that can be attached over the base IR lens assembly 104. In use, an operator can select a desired add-on IR lens from a set of available add-on IR lenses and attach the selected add-on IR lens to the thermal imaging camera 100. If desired, the selected add-on IR lens can subsequently be detached from the thermal imaging camera 100 so the camera can either be used with the base IR lens assembly 104 alone or a different add-on IR lens can attached to the camera. Different add-on IR lenses may be used, for example, depending on the size of the object scene, the distance to the target under inspection, or the like. Although the add-on IR lens is detachable from the base IR lens assembly 104, in some embodiments, the base IR lens assembly 104 can be fixedly mounted to the camera housing 102 and is not intended to be detached during normal use.

Figure 4:
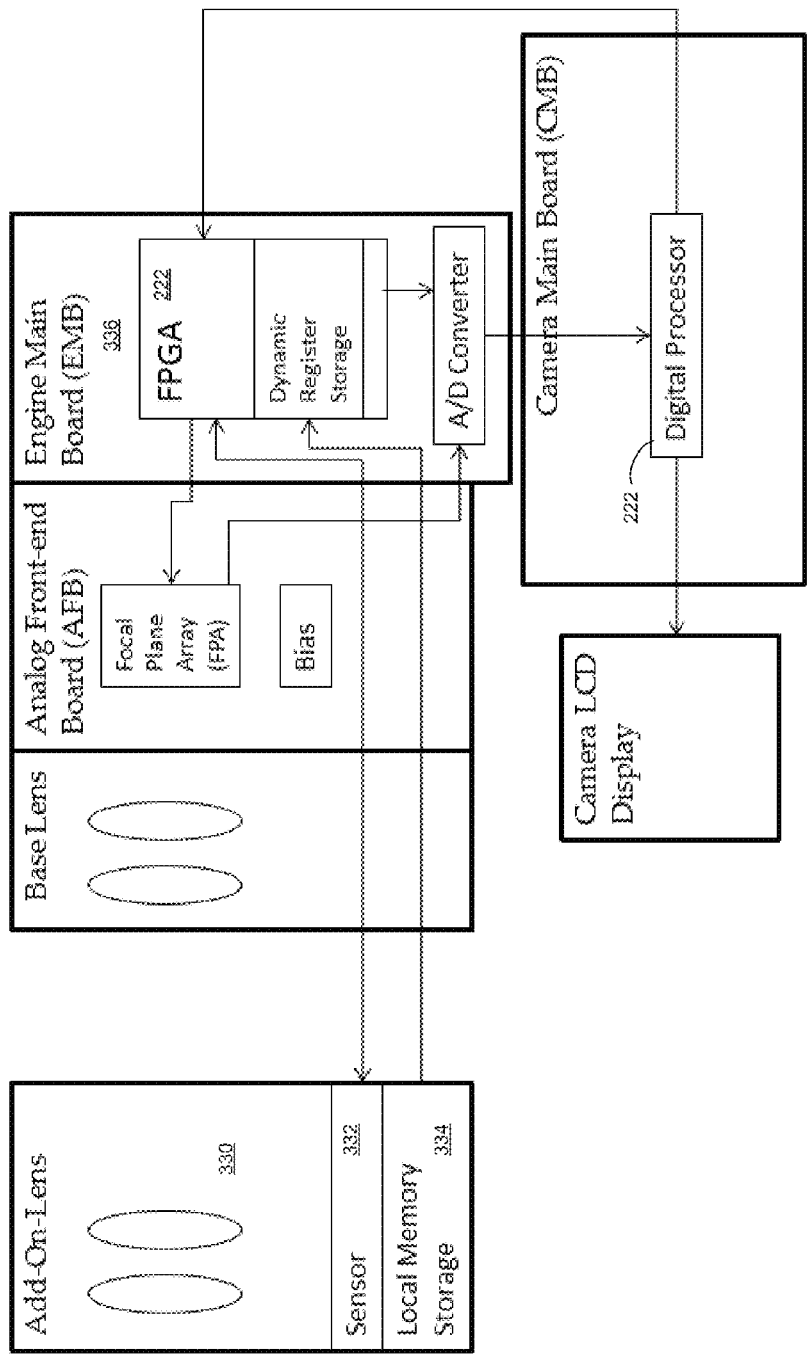
FIG. 4 is a schematic representation showing engagement and communication between portions of the thermal imaging camera and an add-on IR lens.

FIG. 4 is a schematic representation showing engagement and communication between portions of the thermal imaging camera 100 and an add-on IR lens 330, when used. As shown, an add-on IR lens 330 can comprise a local memory storage 334 that stores data unique to the specific add-on IR lens 330 being attached to the thermal imaging camera 100. The add-on IR lens 330 can further include a sensor 332 for detecting operating conditions such as a temperature sensor. In some embodiments, when the add-on IR lens 330 is attached to the thermal imaging camera 100, the sensor 332 and/or local memory storage 334 of the add-on IR lens 330 are placed in communication with the processor/FPGA 222 housed inside of the camera 100.

To generate infrared images using the thermal imaging camera 100, the imager stores a set of mathematical algorithms in memory within the body of the camera. During operation as described below, the thermal imaging camera 100 executes the mathematical algorithms to process data generated by the focal plane array and/or VL camera module, thereby creating IR and/or VL images using the camera. In some configurations, the mathematical algorithms may utilize data relating to camera operation during capture of a particular infrared image (e.g., distance to target, ambient temperature, lens temperature) as input variables. The mathematical algorithm may also utilize two types of input parameters: base parameters and lens-specific parameters for adjusting for parallax error, for example. The base parameters are constants determined for the base thermal imaging camera without an add-on lens attached 330. In some embodiments, the base parameters do not vary depending on the presence or type of add-on lens 330 attached to the camera. Such base parameters may be stored in memory within the camera. The lens-specific parameters may be numerical values received from an attached add-on lens and input into the mathematical algorithm stored in the camera, for example. Alternatively, lens-specific parameters can include a generic type of lens, such as a wide-angle lens or a narrow-angle lens. In some such examples, the user can select a type of lens associated with add-on lens parameters in a parallax correction mathematical algorithm. When there is no add-on lens attached to the camera, the add-on lens parameters may be set to or otherwise equal to zero or otherwise be negated, and the mathematical algorithms are executed to process focal plane array signals using the base parameters and the data relating to camera operation during capture of a particular infrared image. Accordingly, a single mathematical algorithm may be employed for instances in which an add-on lens is present or absent.

Each add-on lens 330 used by the thermal imaging camera 100 can contain lens-specific parameters stored on the local memory storage 334 for that particular lens. In some embodiments, up to three types of lens-specific parameters can be stored on the local memory storage 334 for each add-on lens: (1) parameters for correcting parallax between an IR image generated using the add-on IR lens 330 and a corresponding visible light image, (2) parameters for determining the correct physical position of the IR focusing lens when using the add-on IR lens 330, and (3) parameters for calculating radiometry terms related to the add-on IR lens 330.

When the add-on lens 330 is attached to the thermal imaging camera 100, one or more lens-specific parameters may be communicated from the local memory storage 334 of the lens to the processor 222 within the camera and subsequently used in execution of the mathematical algorithms stored in memory. In particular, processor 222 may use the base parameters stored in memory and the lens-specific parameters received from local memory storage 334 as values in the mathematical algorithms to generate infrared images. In some methods of operation, the thermal imaging camera 100 may always execute the same mathematical algorithm or set of mathematical algorithms regardless of whether the add-on IR lens 330 is attached to the camera.

In some embodiments, mathematical algorithms such as those referenced previously can be used to correct parallax errors existing between corresponding IR and VL images. For example, the camera may shift one or both of viewed or captured IR and VL images relative to one another by a calculated amount to correct for a calculated parallax. In some such calculations, the camera uses an input from the lens and/or user as an input into such mathematical algorithms for determining, and subsequently correcting for, parallax error. In other embodiments, a user may manually focus the camera to adjust the spatial relationship between IR and VL images in an effort to reduce/remove parallax error. As previously described, some cameras can correlate a focus position to a distance-to-target approximation, and accordingly apply a distance-to-target parallax correction based on the focus position. In other embodiments, the camera may determine the distance to target via other methods, such as a laser measurement, for example.

Figure 5:
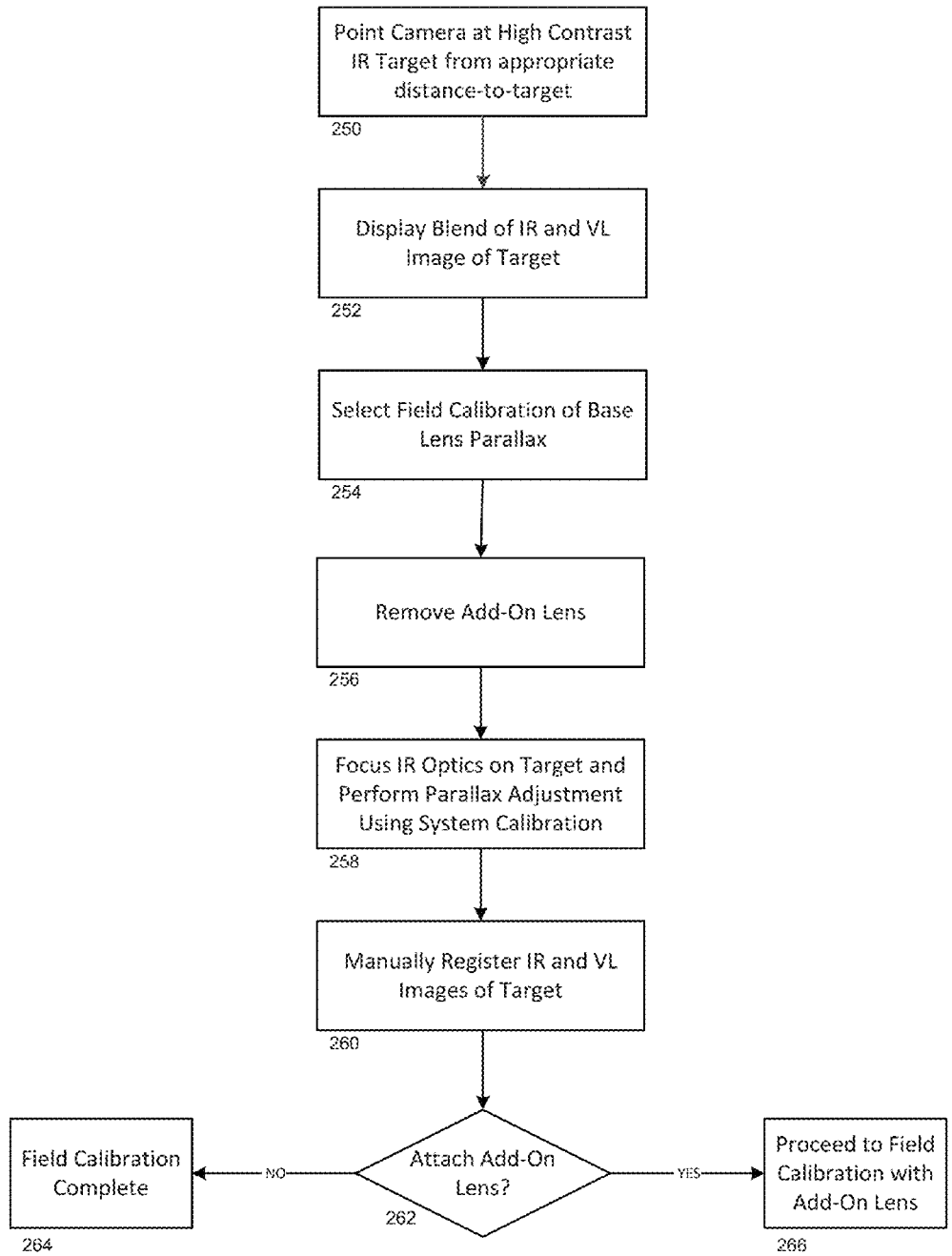
FIG. 5 is a process flow diagram illustrating an exemplary method for fine-tuning parallax error.

In some instances, however, such parallax corrections can be insufficient for eliminating a parallax error in the opinion of a user of the camera. Aspects of the present disclsoure provide system and methods for a user to fine-tune a parallax correction via a field calibration if the user desires additional parallax correction. FIG. 5 is a process flow diagram illustrating an exemplary method for fine-tuning parallax error. In the exemplary method, a user can point 250 a camera at a high contrast IR target from an appropriate distance-to-target. In some cameras, the parallax error between the VL and IR images decreases with distance between the camera and the target, and in further embodiments, the rate of change of parallax with distance also decreases with distance. Similarly, in some such cameras, the parallax error increases dramatically as the distance-to-target becomes small. Accordingly, the appropriate distance-to-target as in step 250 can include a minimum distance-to-target to eliminate the large parallax associated with very short target distances. In some embodiments, a distance-to-target of greater than approximately 4 feet will suffice. In further configurations, the appropriate range can include an upper limit. In some embodiments, the camera can provide an alert or prompt to the user to use a target meeting specified distance-to-target criteria, and/or display a measured or estimated distance-to-target value. In an exemplary embodiment, an appropriate range according to the process of FIG. 5 can be between approximately 4 feet and approximately 10 feet.

With the camera pointed at the high contrast IR target, the camera can display 252 a blend of IR and VL images of the target scene. In some embodiments, the user can select the amount of blending between the IR and VL images. In some situations, the user can select from a predetermined list of blending ratios, such as a minimum IR, a medium IR, and a maximum IR blend. In some instances, a user might desire to use a minimum IR setting in order to clearly view both the IR and the VL image data. However, in some embodiments, the user can manually adjust the amount of blending so that both the IR and VL images can be observed on a display.

Figure 7:
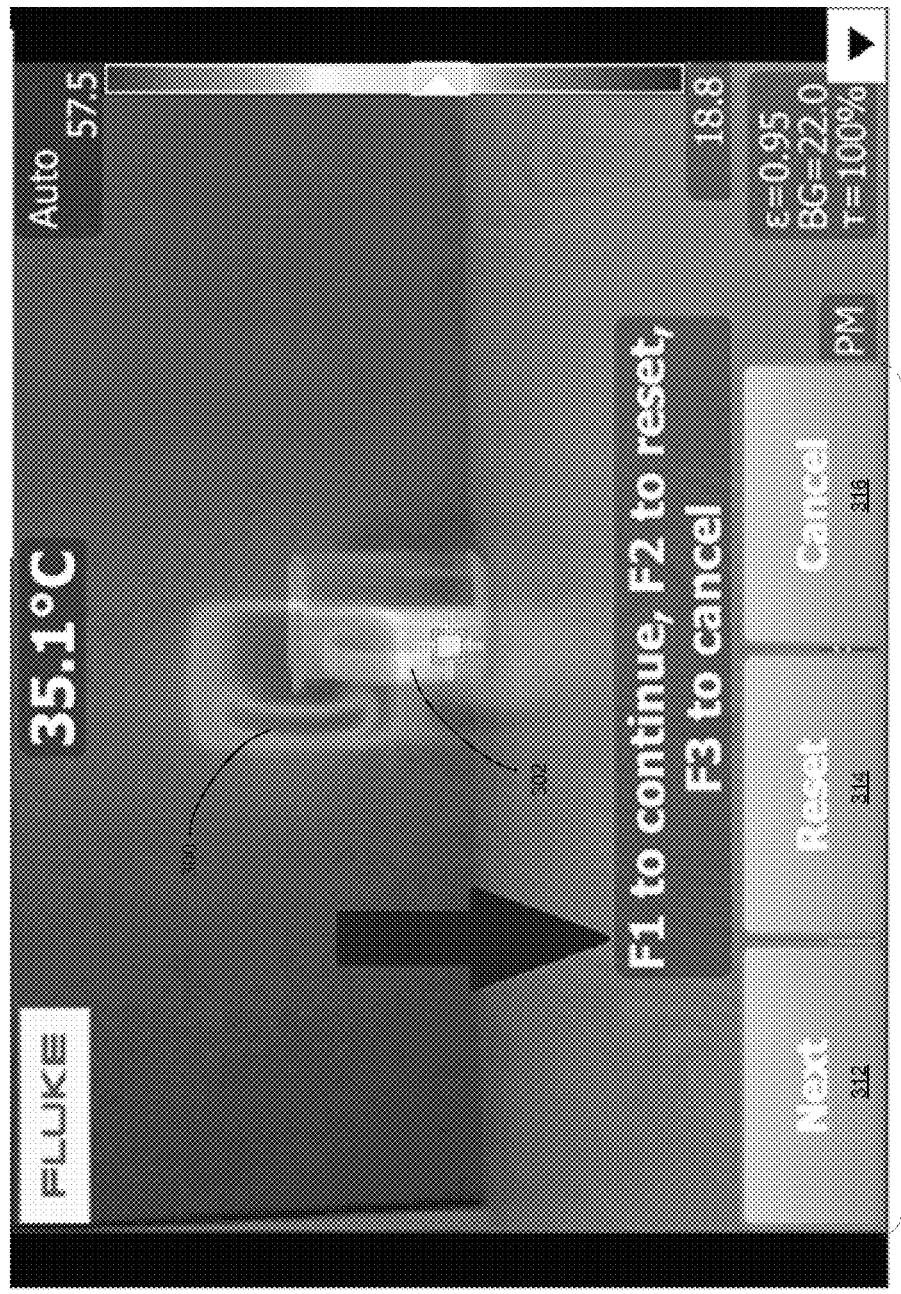
FIG. 7 is an exemplary screen shot illustrating a blended IR and VL image including a parallax error.

Upon achieving a desired display of the blended IR and VL images of the target scene, a user can select 254 field calibration of the base lens parallax. Generally, a user can initiate such a procedure if a noticeable parallax error is present between the IR and VL images. Because IR images are generally more difficult to interpret than VL images due to a general lack of sharp contrasts in a thermal scene, utilizing the high-contrast image can assist the user to identify objects in the IR scene and notice any parallax error present between the VL and IR images. An exemplary high contrast image might include, for example, a mug filled with a warm beverage as shown in FIG. 7.

Upon selecting 254 field calibration of the base lens parallax, embodiments of the camera can detect the presence of an add-on lens. Because a base lens field calibration is being performed, performing such a calibration with an add-on lens present can negatively impact the calibration. Accordingly, if such a lens is detected, the camera can prompt the user to remove 256 the add-on lens for the purposes of performing the calibration.

Once the lens is removed, the camera and/or the user can focus IR optics on the target and/or perform 258 a parallax adjustment using system calibration. In some embodiments, the parallax adjustment can include a known parallax adjustment technique such as those herein described. For example, the user can manually adjust the focus of the camera and observe a resulting shift of one or both of the IR and VL images toward correcting the parallax error. In some such examples, the parallax adjustment results from an analog adjustment of the position of one or more lenses. In an alternative embodiment, the user can manually focus the camera and, based on the focus position, the camera can estimate a distance-to-target between the camera and the target scene and apply an associated parallax correction accordingly. Such applied parallax correction can include a digital shifting of one of the IR and VL images relative to the other. Similarly, the camera can be equipped with one or more methods for directly determining the distance to target for performing a similar parallax correction automatically.

The parallax error may be corrected manually or electronically. For example, U.S. Pat. No. 7,538,326 entitled "Visible Light and IR Combined Image Camera with a Laser Pointer," which is incorporated herein by reference in its entirety, discloses a parallax error correction architecture and methodology. This provides the capability to electronically correct the IR and VL images for parallax. In some embodiments, thermal instrument 100 includes the ability to determine the distance to target and contains electronics that correct the parallax error caused by the parallel optical paths using the distance to target information. It will be appreciated that with respect to the performing 258 a parallax adjustment, any such technique for correcting parallax can be used.

After performing 258 a parallax adjustment, it is possible that some parallax error will still remain. In the event that the user can observe the residual parallax error between the IR and VL images, the user can manually register 260 the IR and VL images of the target scene. In doing so, the user can manually fine-tune the parallax adjustment, providing parallax refinement data to the camera and eliminating residual parallax error that was not corrected by the known parallax adjustment technique. Manually registering 260 can include, for example, moving one of the IR and VL images in positive or negative x and y directions. In some embodiments, manually registering the images comprises translating the VL image with respect to the IR image. Such manual fine-tune adjustments to the parallax correction can include, for example, a digital shifting of one of the VL and IR images relative to the other.

In general, manually registering 260 the images can be performed on the camera via the user interface. In some embodiments, the camera presents the user with a live IR and VL image blend of the scene which the user uses to manually register the IR and VL images in real time. In some configurations, the camera will capture corresponding IR and VL images, and the user can manually register the captured IR and VL images as still images. In still further embodiments, captured IR and VL images can be streamed into or captured and stored on an external computer. In such instances, the registration of the IR and VL images can be performed on the computer. In some embodiments, once the user has manually registered 260 the IR and VL images, the camera can store the parallax refinement data in memory and automatically apply such refinement data to subsequent captured corresponding IR and VL images. In the event that the registration was performed in a stand-alone computer, the computer can upload parallax refinement data to the camera, or the user can manually enter parallax refinement data from the computer into the camera.

After performing the base lens parallax adjustment, the user can determine 262 whether or not an add-on lens is desired. If not, the field calibration is complete 264, and the user can proceed in using the camera to capture subsequent corresponding IR and VL images incorporating the fine-tuned parallax correction. In the event the user desires to further adjust the parallax correction, the process of FIG. 5 can simply be repeated. In some examples, a user can also remove all parallax refinement data and restore the camera to a default setting.

It should be noted that, in the process illustrated in FIG. 5 and outlined above, various steps may be omitted or permuted. For example, a user need not remove 256 an add-on lens if such a lens was not present. In some embodiments, the user can select 254 field calibration of the base lens parallax prior to pointing the camera at the high contrast scene or displaying the blended IR and VL images of the target. In some embodiments, the known parallax adjustment technique can be performed 258 prior to selecting 254 field calibration of the base lens parallax. Other permutations of such steps may be performed without departing from the spirit of the invention, as will be evident to those skilled in the art.

In the event, however, that the user does decide 262 to attach an add-on lens, the user and/or camera can proceed 266 to a field calibration with the add-on lens. Such calibration may be necessary, as the addition of an add-on lens to, for instance, the IR camera module can change the field of view of the IR image and thus may have an impact on the parallax between the IR and VL images. To perform such calibration, the user can attach 280 an add-on lens to the camera and point 282 the camera at a high contrast IR target from an appropriate distance-to-target, and the camera can display 284 a blend of corresponding IR and VL images of the target. The user can select 286 field calibration of the add-on lens parallax to initiate further parallax refinement including the add-on IR lens.

When viewing the displayed blend, and to perform field calibration, the user and/or camera can focus 288 optics on the target scene and/or perform a parallax adjustment using system calibration. In the event that the add-on lens is an IR lens, IR optics can be focused on the target scene. In some configurations, focusing the IR optics on the target scene can, given the previously performed base parallax refinement, align the IR and VL images to approximately the closest point possible via a focusing technique. In some instances, as was the case with the known parallax adjustment procedure in the base parallax correction, after performing an alignment process (i.e., focusing), there still may exist a parallax error between the corresponding IR and VL images. Accordingly, the user can manually register 290 the IR and VL images of the target scene. Such manual registration can be performed similarly to the manual registration step 260 shown in FIG. 5 and described above. Once the user has manually registered the IR and VL images, the field calibration is complete 292, the add-on parallax refinement can be stored in camera or lens memory, for example as values to be used in a mathematical algorithm. Subsequently, the user can operate the camera with the add-on lens with a refined parallax adjustment. As was the case with the base lens parallax refinement, in some embodiments, a user can remove all add-on lens parallax refinement data and restore the camera to a default setting with regard to adjusting for the add-on lens.

Figure 6:
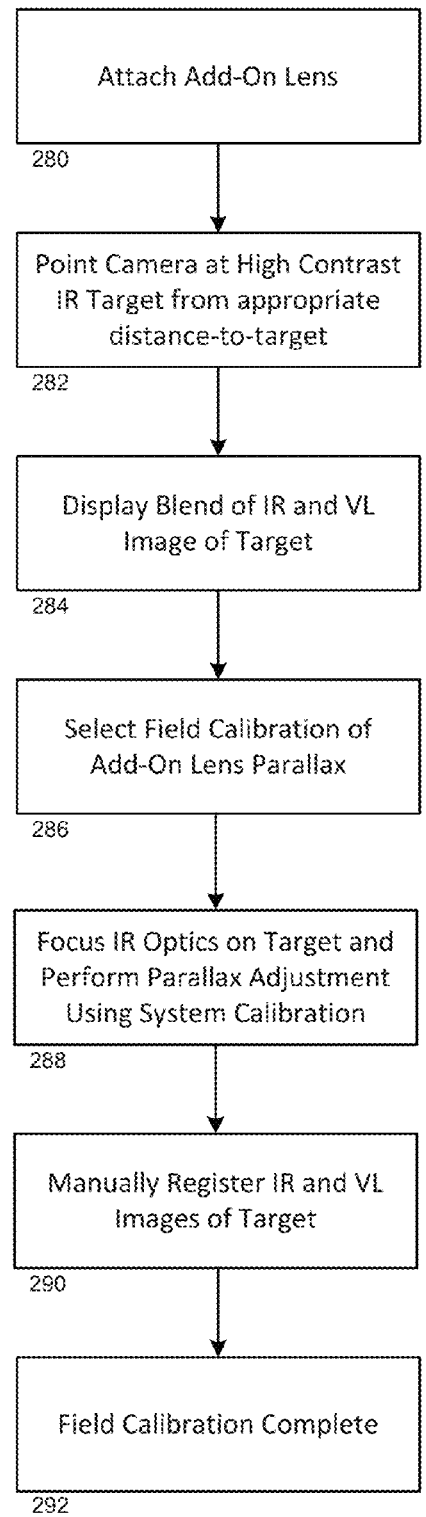
FIG. 6 is a process flow diagram illustrating an exemplary method for fine-tuning parallax error while using an add-on IR lens.

The steps illustrated in the method of FIG. 6 are similar in nature to that of FIG. 5, however, in implementing the changes resulting from such steps, the result of the processes of FIGS. 5 and 6 are distinct. With respect to FIG. 5, parallax refinement is performed regarding the base lens parameters. Such adjustments are applied to the camera regardless of the effects of an add-on lens. In some embodiments, once such refinement values have been determined and stored in the camera, they will continually be used in mathematical algorithms in eliminating parallax errors between the IR and VL images. However, the parallax refinement in the presence of an add-on lens as illustrated with respect to FIG. 6 will only affect the parallax adjustment in the presence of an add-on lens. When such an add-on lens is present, both the base lens parallax refinement and the add-on lens parallax refinement are used to minimize the parallax between the IR and VL images.

Parallax refinement associated with the add-on lens can be stored in the lens and/or the camera. For example, a parameter to be used in a mathematical algorithm for adjusting the add-on lens parallax and established via the method outlined in FIG. 6 can be stored in the lens and utilized whenever the lens is attached. In some embodiments, a single parameter might be applicable to all lenses having a certain property, such as wide-angle lenses. For example, during use, a user could attach an add-on lens to the camera and subsequently input an identifying parameter about the lens (e.g., wide-angle lens) into the camera for recalling parallax refinement data defined in the past. In other embodiments, the effect of the add-on lens can be particular to the specific camera. In such embodiments, the parallax refinement data associated with the user refinement in the presence of the lens can be stored in the camera.

In some embodiments, upon the removal of an add-on lens, the add-on lens parallax refinement will cease affecting the parallax adjustment performed by the camera. For instance, in some examples, values input from the add-on lens into a mathematical algorithm for parallax adjustment will become zero upon removal of the lens. However, in some embodiments, the base lens parallax refinement data will still be used to adjust the parallax between IR and VL images. Thus, in some embodiments, the base lens parallax refinement will be used with or without the presence of an add-on lens, while the add-on lens parallax refinement will only have an effect when the add-on lens is present.

FIG. 7 is an exemplary screen shot illustrating a blended IR and VL image including a parallax error. A similar view might be presented to a user during operation, for example when a user is manually registering and IR and VL images of the target scene. In the illustrated embodiment, the target scene comprises a mug containing warm fluid in a comparably cooler environment, thereby presenting a high contrast thermal scene with distinctive features. Additionally, the mug is a small enough object that it will be relatively easy to see when the IR and VL images are aligned. As shown, the mug in the IR image 300 is offset from the mug in the VL image 302 due to parallax. If, for example, such an image is presented to a user after steps 258 or 290 in which parallax errors are generally accounted for, the user can adjust the relative positions of the IR and VL with respect to one another by manually registering the IR and VL images as described with respect to FIGS. 5 and 6.

Also shown in FIG. 7 are user options 310, by which a user can be guided through the parallax adjustment process. For example, the user can choose to progress through various stages of parallax adjustment/refinement (e.g., via option 312), can choose to reset parallax refinement to a default setting (e.g., via option 314), or can cancel the parallax adjustment entirely (e.g., via option 316). In performing the parallax refinement, the user can use a user interface, for example, arrows or a touch screen, to reposition (e.g., digitally) one image relative to the other to correct the existing parallax error. In some embodiments, the user will move the visible light image relative to a fixed IR image in order register the IR and VL images. For example, with respect to FIG. 7, a user can shift the VL image 302 up and to the left in order to register the VL 302 and IR 300 images.

As previously discussed, a camera can employ mathematical algorithms to process images. In some examples, the camera can employ some such algorithms in order to correct for a parallax error. In further embodiments, algorithms can include one or more components for taking into account an add-on lens, in addition to one or more user-adjustable components for fine-tuning a parallax correction in the presence and absence of an add-on lens. Equation (1) below exemplifies one such algorithm that can be used for adjusting a parallax error between IR and VL images according to some embodiments of the invention.

$$C2_X = C2_{X_{Base}} + C2_{X_{Add}} - \left[ \frac{(C2C_{X_{Base}} + C2C_{X_{Base\,Adjust}}) \times A_X \times IR_{FOV_{XAdd}}}{VL_{IFOV_X}} \right] + C2_{X_{Adjust}} + K_X \quad (1)$$

Equation (1) comprises several terms for shifting VL and IR images relative to one another in order to adjust for a parallax error. Properties associated with each term in Equation (1) and an explanation of their incorporation into the equation are outlined below in Table 1:

TABLE 1

Properties of Terms in Equation (1)

| Term | Properties |
|---|---|
| $C2_X$ | Represents the total calculated parallax offset in the x-direction (can be further adjusted to account for distance-to-target or other factors contributing to parallax) <br> Measured in VL pixel counts <br> Calculated at sub-integer level, rounded to nearest integer <br> Can be several hundred pixels in value |
| $C2_{X_{Base}}$ | Represents base lens VL parallax offset in the x-direction independent of distance-to-target or add-on lens <br> Factory calibrated parallax adjustment for distance-to-target at ∞ <br> Measured in VL pixels <br> Can be several hundred pixels in value |
| $C2_{X_{Add}}$ | Additive VL pixel offset for add-on lens in the x-direction <br> Only non-zero if lens is present <br> Value can be stored in lens |
| $C2C_{X_{Base}}$ | Factory calibrated offset regarding a shift of the center of the IR FPA relative to the IR optical axis in the x-direction <br> Generally in terms of IR pixels - needs to be converted to VL pixels for Equation (1) |
| $A_X$ | Scaling factor for establishing ratio of VL pixels per IR pixel in the x-direction |
| $VL_{IFOV_X}$ | VL instantaneous field of view of a single pixel measured in milliradians <br> Establishes ratio of VL pixels per IR pixel in the x-direction |
| $IR_{FOV_{XAdd}}$ | IR field of view modifier for the add-on lens <br> Establishes ratio of VL pixels per IR pixel in the x-direction with respect to an IR add-on lens <br> Zero in the absence of an add-on lens |
| $K_X$ | Fixed base adjustment <br> Any additional linear factory base adjustment for VL pixel shift in the x-direction |
| $C2_{X_{Adjust}}$ | User adjustable <br> Field calibration of base parallax adjustment <br> Sent to zero if field calibration reset |
| $C2C_{X_{Base\,Adjust}}$ | User adjustable <br> Field calibration of add-on lens-based parallax adjustment <br> Sent to zero if add-on lens field calibration reset <br> Specific to camera base engine |

Various values representative of properties of the add-lens can be stored in the add-on lens. In some embodiments, lens-dependent terms such as $C2_{X_{Add}}$ and $IR_{FOV_{X\,Add}}$ can be stored in the lens and communicated to the camera for performing a parallax adjustment including an add-on lens. Additional lens-dependent adjustment terms can be stored in the lens once defined in the event that a lens contributes consistently to parallax. In the exemplary embodiment reflected in Equation (1), the adjustment term $$C2C_{X_{Base\,Adjust}}$$

is representative of a camera engine baseline adjustment term. Accordingly, such a term is likely to be stored in the camera. However, it is contemplated that additional terms not present in illustrative Equation (1) can be incorporated into such a parallax adjustment equation to represent a parallax error induced by the lens and further adjusted by a user to refine the parallax correction.

As referenced in Table 1, because the field of view (FOV) and/or resolution of the IR and VL imaging modules can be different, in order to properly adjust one of the IR and VL images relative to the other, one or both images can be scaled so that each image is directly comparable to the other. For example, the term in square brackets in Equation (1) can be generally used to register IR and VL images in the presence of an add-on IR lens. Because the overall parallax adjustment term $C2_X$ is represented in VL pixels, an adjustment corresponding to an adjustable shift in IR pixels in the form of $(C2C_{X_{Base}} + C2C_{X_{Base\,Adjust}})$ is not directly comparable to $C2_X$. Accordingly, a scaling term $$\frac{A_X \times IR_{FOV_{XAdd}}}{VL_{IFOV_X}}$$

can be incorporated to account for variations in resolution and FOV between the VL and IR camera modules, particularly in the case of an add-on IR lens.

In the event that no add-on lens is present, the term in square brackets goes to zero, and Equation (1) becomes:

$$C2_X = C2_{X_{Base}} + C2_{X_{Adjust}} + K_X$$

which comprises only base terms. Accordingly, in some such embodiments, with no add-on lens present, a user can adjust the base lens parallax in accordance with the method of FIG. 5. That is, $C2_{X_{Base}}$ can be established in step 258 in which a parallax adjustment is performed. Subsequently, a user can manually register 260 the IR and VL images of a target scene by adjusting the value of $C2_{X_{Adjust}}$. If no add-on lens is intended for use, field calibration for parallax correction in the x-direction is complete. Thus, Equation (1) can be used in the presence or absence of an add-on lens.

When an add-on lens is used, the term in square brackets may be non-zero, and can be used to (i) further adjust the parallax correction in the x-direction due to the addition of an add-on IR lens due to a change in the IR field of view, and (ii) allow for a user fine-tune such adjustment. In some embodiments, Equation (1) can be used in the presence of an add-on lens in accordance with the method of FIG. 6. For example, the camera and/or a user can focus IR optics on a target scene and perform a parallax adjustment using a system calibration. Such focusing and/or the parallax adjustment can, in some configurations, reduce a parallax error in the x-direction in the image by way of incorporating values of $C2_{X_{Add}}$ and $IR_{FOV_{X\,Add}}$ into Equation (1). However, in some instances, a parallax error in the x-direction may remain. In such instances, the user can manually register 290 the IR and VL images of the target by adjusting the value of $C2_{X_{Base\ Adjust}}$.

As can be seen, in embodiments of the camera incorporating mathematical algorithms such as shown in Equation (1), a single equation can be used to manually fine-tune parallax adjustments in the presence or absence of an add-on lens. Simply assigning values of the equation to zero in the absence of an add-on lens enables a single algorithm to be used in either situation.

In some embodiments, a user can perform a single-step or a two-step parallax field calibration process. The single step field calibration, a user can perform a method such as illustrated in FIG. 5, manually fine-tuning parallax adjustments, in some cases after a traditional and inadequate parallax adjustment has been performed. In the event that no add-on lens will be used, such fine-tuning can minimize residual parallax errors for further imaging and/or analysis of a target scene. As this is performed in the absence of an add-on lens, such a single-step process can be considered a base parallax field calibration process. In other examples, the user can attach an add-on lens to the camera and perform the single-step field calibration with the lens attached. That is, in some embodiments, a single-step calibration can be performed as the operator intends to use the camera: if no add-on lens is to be used, the single-step calibration is performed without an add-on lens; if an add-on lens is desired, the single-step calibration is performed with the add-on lens attached. In the event of a single-step calibration with an add-on lens present, a modified version of the method of FIG. 5 may be implemented in which steps 256, 262, and 266 are omitted, and step 254 comprises selecting a first parallax calibration mode.

Alternatively, a user can perform a two-step calibration process in the event that an add-on lens is to be used. For instance, a user can perform the single-step field calibration process without the add-on lens in order to adjust the base parallax calibration as a first calibration step. The user can subsequently attach the add-on lens and perform a second calibration step in order to perform the two-step parallax field calibration process. The second calibration step can include a process such as is outlined in FIG. 6, in which a user manually fine-tunes parallax adjustments while imaging with the add-on IR lens. In an exemplary embodiment, the user may perform a method similar to that of FIG. 5 without the add-on lens attached as a first step, and a method similar to that of FIG. 6 with the add-on lens attached as a second step.

In some embodiments, a camera can direct a user through such processes, providing instruction for performing a parallax field calibration process. In performing the two-step field calibration process, the user may be required to initiate separate calibration steps, since different parts of Equation (1) are adjusted via calibrating with and without an add-on lens. For example, in an exemplary method, a user selects a first calibration mode and manually registers IR and VL images without an add-on lens to fine-tune the base parallax adjustment. Subsequently, the user can attach and add-on IR lens to the camera, select a second calibration mode, and once again manually register the IR and VL images with the add-on lens present to fine-tune the add-on lens parallax adjustment.

In some examples, a user can perform a single-step process similar to that outlined in FIG. 6. In some configurations, a base camera without an add-on lens can include sufficient parallax correction or previously defined parallax refinement data such that there is no need to perform a field calibration in the absence of the add-on lens. However, in the event that the user incorporates an add-on lens, the field calibration including the lens parameters still may be required. Accordingly, an alternative single-stop process can include attaching an add-on lens to the camera, and performing a field calibration process as herein described to reduce parallax between IR and VL images in the presence of an add-on lens.

While Equation (1) and the description thereof generally focused on adjusting parallax in the x-direction, it will be appreciated that a similar procedure can be performed in the y-direction, as shown in Equation (2):

$$C2_Y = C2_{Y_{Base}} + C2_{Y_{Add}} - \left[\frac{(C2C_{Y_{Base}} + C2C_{Y_{Base\ Adjust}}) \times A_Y \times IR_{FOV_Y Add}}{VL_{IFOV_Y}}\right] + C2_{Y_{Adjust}} + K_Y \quad (2)$$

Equation (2) is similar to Equation (1) in form, but various cameras and/or lenses may have different Base and FOV terms in the y-direction, and may additionally or alternatively require a different parallax adjustment in the y-direction. It will be appreciated that, while x- and y-directions are used in the disclosure, generally any two-dimensional basis can be used for manually registering the IR and VL pixels.

Example thermal image cameras and related techniques have been described. The techniques described in this disclosure may also be embodied or encoded in a computer-readable medium, such as a non-transitory computer-readable storage medium containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), a hard disk, optical media, or other computer readable media.

Additionally, as previously discuss, various aspects of the present invention can be performed on a stand-alone computer in communication with a thermal imaging camera, or otherwise using IR and VL images captured by a thermal imaging camera. Manual parallax refinement on a stand-alone computer can be saved and transferred to the camera for use in capturing subsequent sets of IR and VL images.

Various embodiments have been described. Such examples are non-limiting, and do not define or limit the scope of the invention in any way. Rather, these and other examples are within the scope of the following claims:

The invention claimed is:

1. A method for refining parallax correction in a combination infrared (IR) and visible light (VL) image using a thermal imaging camera comprising:
    providing a thermal imaging camera comprising an IR camera module for producing an IR image and having an IR optical axis, a VL camera module for producing a VL image and having a VL optical axis, a user interface, a processor, memory, and a display, wherein the IR optical axis is offset from the VL optical axis resulting in parallax error between IR and VL images;
    selecting, via the user interface, a first calibration mode;
    performing a first parallax correction to reduce the parallax error between IR and VL images produced by the IR and VL camera modules;

viewing, on the display, both an IR image and a VL image, wherein the IR image and VL image are blended and aligned with respect to one another according to the first parallax correction;

manually registering, via the user interface, the IR and VL images by a first amount to refine the first parallax correction;

generating a first set of parallax refinement data corresponding to the first amount that the IR and VL images were manually registered relative to one another; and saving the first set of parallax refinement data as base parallax refinement data in the memory, the base parallax refinement data being associated with the first calibration mode.

2. The method of claim 1, further comprising;

attaching an add-on IR lens to the IR camera module of the thermal imaging camera to create modified IR images, the add-on IR lens contributing to a parallax error between modified IR and VL images;

selecting, via the user interface, a second calibration mode;

performing a second parallax correction to reduce the parallax error between modified IR images and VL images;

viewing, on the display, both a modified IR image and a VL image, wherein the modified IR image and VL image are blended and aligned with respect to one another according to the second parallax correction;

manually registering, via the user interface, the modified IR image and the VL image of the target scene by a second amount to refine the second parallax correction;

generating a second set of parallax refinement data corresponding to the second amount that the modified IR image and the VL images were manually registered relative to one another; and saving the second set of parallax refinement data as add-on parallax refinement data, the add-on parallax refinement data being associated with the second calibration mode.

3. The method of claim 2 wherein manually registering the IR and VL images comprises shifting the VL image relative to the IR image.

4. The method of claim 2, wherein saved parallax refinement data is incorporated into subsequently captured images by default.

5. The method of claim 2, further comprising resetting the first set of refinement data without modifying the first parallax correction.

6. The method of claim 5, further comprising resetting the second set of refinement data without modifying the second parallax correction.

7. The method of claim 2, wherein the add-on IR lens comprises a lens memory, and wherein saving the second set of parallax refinement data comprises saving the second set of parallax refinement data to the lens memory.

8. The method of claim 7, further comprising:

receiving the second set of parallax refinement data from the lens memory upon attaching the add-on IR lens to the IR camera module; and inputting the received second set of parallax refinement data into a mathematical algorithm for automatically performing a parallax refinement process.

9. A thermal imaging camera system comprising:

an infrared (IR) camera module having an IR optical axis;

a visible light (VL) camera module having a VL optical axis offset from the IR optical axis;

a user interface;

a display;

memory; and a processor; wherein the processor is configured to perform a first process, the first process comprising:

capturing a first IR image using the IR camera module;

capturing a VL first image using the VL camera module;

performing a first parallax correction to reduce parallax error between the first IR and first VL images;

displaying, on the display, a blend of the first IR and first VL images including the first parallax correction;

receiving, via the user interface, a first set of manual registration instructions corresponding to a user's manual registration of the displayed first IR and first VL images;

registering the first IR and first VL images according to the first set of manual registration instructions; and saving the amount of registration performed according to the first set of manual registration instructions in memory as a first set of parallax refinement data.

10. The system of claim 9, further comprising a removable add-on lens attachable to the IR camera module for generating modified IR images, and wherein the processor is further configured to perform a second process, the second process comprising:

capturing a modified IR image using the IR camera module and the removable add-on lens;

capturing a second VL image using the VL camera module;

performing a second parallax correction to reduce parallax error between the modified IR and second VL images;

displaying, on the display, a blend of the modified IR and second VL images including the second parallax correction;

receiving, via the user interface, a second set of manual registration instructions corresponding to a user's manual registration of the displayed modified IR and second VL images;

registering the modified IR and second VL images according to the second set of manual registration instructions; and saving the amount of registration performed according to the second set of manual registration instructions in memory as a second set of parallax refinement data.

11. The system of claim 10, wherein the first IR and first VL images are live images.

12. The system of claim 10, wherein the modified IR image and the second VL image are live images.

13. The system of claim 10, wherein the processor is configured to receive a command to perform a first parallax refinement process prior to receiving the first set of manual registration instructions.

14. The system of claim 10, wherein the processor is configured to receive a command to perform a second parallax refinement process prior to receiving the second set of manual registration instructions.

15. The system of claim 10, wherein the removable add-on lens comprises a memory, the memory capable of communicating with the processor of the camera when the lens is attached to the IR camera module; and saving the amount of registration performed according to the second set of manual registration instructions in memory as a second set of parallax refinement data comprises saving the second set of manual registration instructions in the memory of the add-on lens.

16. The system of claim 9, further comprising a removable add-on lens attachable to the IR camera module for generating modified IR images, and wherein the first IR image comprises a modified IR image.

17. A system comprising:
a thermal imaging camera comprising:
an infrared (IR) camera module having an IR optical axis and configured to capture IR images;
a visible light (VL) camera module having a VL optical axis offset from the IR optical axis and configured to capture VL images;
a user interface;
a display;
memory; and
a processor capable of:
performing a first parallax adjustment process resulting in a first parallax adjustment to reduce parallax error between a first IR image and a first VL image;
presenting the first IR image and first VL images including the first parallax adjustment simultaneously on the display;
receiving, via the user interface, a first set of manual registration instructions corresponding to a user's manual registration of the displayed first IR and first VL images;
saving the amount of registration performed according to the first set of manual registration instructions in memory as a first set of parallax refinement data; and
recalling the first set of parallax refinement data from memory for use in a parallax refinement mathematical algorithm.

18. The system of claim 17, further comprising a removable add-on lens attachable to the IR camera module for generating modified IR images, the add-on lens including a lens memory in communication with the processor of the thermal imaging camera when the add-on lens is attached to the IR camera module.

19. The system of claim 18, wherein the processor is further capable of:
performing a second parallax adjustment process to reduce parallax error between a modified IR image and a second VL image;
presenting the modified IR image and second VL images including the second parallax adjustment simultaneously on the display;
receiving, via the user interface, a second set of manual registration instructions corresponding to a user's manual registration of the displayed modified IR and second VL images;
saving the amount of registration performed according to the second set of manual registration instructions to the lens memory as a second set of parallax refinement data; and
recalling the second set of parallax refinement data from the lens memory for use in the parallax refinement mathematical algorithm when the add-on lens is attached to the IR camera module.

20. The system of claim 18, wherein the processor is configured to receive add-on parallax refinement data from the memory of the add-on lens for use in the parallax refinement mathematical algorithm when the add-on lens is attached to the IR camera module.

* * * * *